(12) United States Patent
Degeorgis et al.

(10) Patent No.: US 11,516,339 B2
(45) Date of Patent: Nov. 29, 2022

(54) SYSTEMS AND METHODS FOR PROVIDING CALLING PARTY INFORMATION

(71) Applicant: Neustar, Inc., Sterling, VA (US)

(72) Inventors: Marybeth C. Degeorgis, Seaside Park, NJ (US); Kenneth McWilliams, San Diego, CA (US); Aleksandr Fedoseyev, McLean, VA (US); Padmavati Chitrapu, Sterling, VA (US)

(73) Assignee: Neustar, Inc., Reston, VA (US)

( * ) Notice: Subject to any disclaimer, the term of this patent is extended or adjusted under 35 U.S.C. 154(b) by 0 days.

(21) Appl. No.: 17/140,427

(22) Filed: Jan. 4, 2021

(65) Prior Publication Data

US 2021/0377388 A1  Dec. 2, 2021

Related U.S. Application Data

(63) Continuation of application No. 16/020,942, filed on Jun. 27, 2018, now Pat. No. 10,887,457.

(60) Provisional application No. 62/525,649, filed on Jun. 27, 2017.

(51) Int. Cl.
*H04M 3/42* (2006.01)
*H04M 3/436* (2006.01)

(52) U.S. Cl.
CPC ... *H04M 3/42093* (2013.01); *H04M 3/42059* (2013.01); *H04M 3/4365* (2013.01)

(58) Field of Classification Search
CPC ......... H04M 3/42059; H04M 3/42093; H04M 3/4365

USPC ................ 379/88.01–88.28, 142.01–142.18, 379/67.1–88.28, 265.01–266.1, 90.01, 379/93.01–93.04, 145; 370/351–357
See application file for complete search history.

(56) References Cited

U.S. PATENT DOCUMENTS

| | | | |
|---|---|---|---|
| 9,241,013 B2 | 1/2016 | Chow et al. | |
| 9,277,049 B1 | 3/2016 | Danis | |
| 9,774,731 B1 | 9/2017 | Haltom et al. | |
| 10,135,973 B2* | 11/2018 | Algard | H04M 3/42042 |
| 10,887,457 B1* | 1/2021 | Degeorgis | H04M 3/4365 |
| 2007/0039040 A1 | 2/2007 | McRae et al. | |
| 2011/0280160 A1* | 11/2011 | Yang | H04L 65/1079 370/259 |
| 2015/0043724 A1 | 2/2015 | Farris | |
| 2016/0360036 A1* | 12/2016 | Ansari | H04M 1/57 |
| 2018/0324297 A1 | 11/2018 | Kent et al. | |

\* cited by examiner

*Primary Examiner* — Hemant S Patel
(74) *Attorney, Agent, or Firm* — Sterne, Kessler, Goldstein & Fox P.L.L.C.

(57) ABSTRACT

System and methods for providing calling party information are disclosed. In one implementation, a server for providing calling party information includes one or more processors configured to receive a query for calling party information from a carrier. The query includes an identifier associated with the calling party. The processors are further configured to determine a score based on one or more previously obtained queries, generate the calling party information based on the score, and transmit the calling party information to the carrier. The carrier transmits the calling party information to a device associated with the called party as a Caller ID Name (CNAM).

18 Claims, 3 Drawing Sheets

SYSTEMS AND METHODS FOR PROVIDING CALLING PARTY INFORMATION

CROSS REFERENCE TO RELATED APPLICATIONS

This application is a continuation of U.S. Non-Provisional application Ser. No. 16/020,942, filed Jun. 27, 2018, which claims priority to and benefit from U.S. Provisional Patent Application No. 62/525,649, filed on Jun. 27, 2017, all of which are hereby incorporated by reference in their entirety.

TECHNICAL FIELD

The present disclosure pertains to systems and methods for providing calling party information. In particular, the present disclosure pertains to systems and methods for providing calling party information to a called party's device as a Caller ID Name (CNAM).

BACKGROUND

The proliferation of illegal robocalls and the threat of phone scams have caused consumers to stop answering calls or responding to texts unless the identity of the callers are known to them. In the first six months of year 2016, consumers lost around $350 million to telephone scams and filed over 1.4 million complaints with the Federal Communications Commission (FCC). Moreover, it has been estimated that 97% of business-related calls are unanswered and 82% of voicemails left by businesses are ignored.

In the United States, a name associated with the calling party (i.e., Caller ID Name (CNAM)) is displayed on the screen of a landline telephone, mobile phone, or other communications device of the consumer or called party, resulting from a query to a CNAM database or Line Information Database (LIDB) by the terminating carrier. When a terminating carrier queries the CNAM or LIDB with the calling party's telephone number (i.e., Caller ID), the database returns the associated name (e.g., CNAM). Due to telecom switch and network capabilities, for wireline service this name is limited to a 15-character representation. With legacy SS7 networks, tampering by scammers and fraudsters was rare, however, as carriers have increasingly enabled IP networks, call path interference has increased. In addition, the introduction of automated outbound dialers are increasingly used, only adding to consumer frustration.

SUMMARY

In one embodiment, a server for providing calling party information includes one or more processors configured to receive a query for calling party information from a carrier. The query includes an identifier associated with the calling party. The processors are further configured to determine a score based on one or more previously obtained queries, generate the calling party information based on the score, and transmit the calling party information to the carrier. The carrier transmits the calling party information to a device associated with the called party as a Caller ID Name (CNAM).

In another embodiment, a method for providing calling party information includes receiving a query for calling party information from a carrier. The query includes an identifier associated with the calling party. The method further includes determining a score based on one or more previously obtained queries, generating the calling party information based on the score, transmitting the calling party information to the carrier, wherein carrier transmits the calling party information to a device associated with the called party as a CNAM.

In yet another embodiment, a non-transitory computer-readable storage medium stores instructions that, when executed by a computer, cause the computer to perform a method for providing calling party information. The method includes receiving a query for calling party information. The query includes an identifier associated with the calling party. The method further includes determining a score based on one or more previously obtained queries, generating the calling party information based on the score, transmitting the calling party information to the carrier, wherein carrier transmits the calling party information to a device associated with the called party as a CNAM.

BRIEF DESCRIPTION OF THE DRAWINGS

Embodiments of the disclosed technology will be described and explained through the use of the accompanying drawings.

Figure 1:
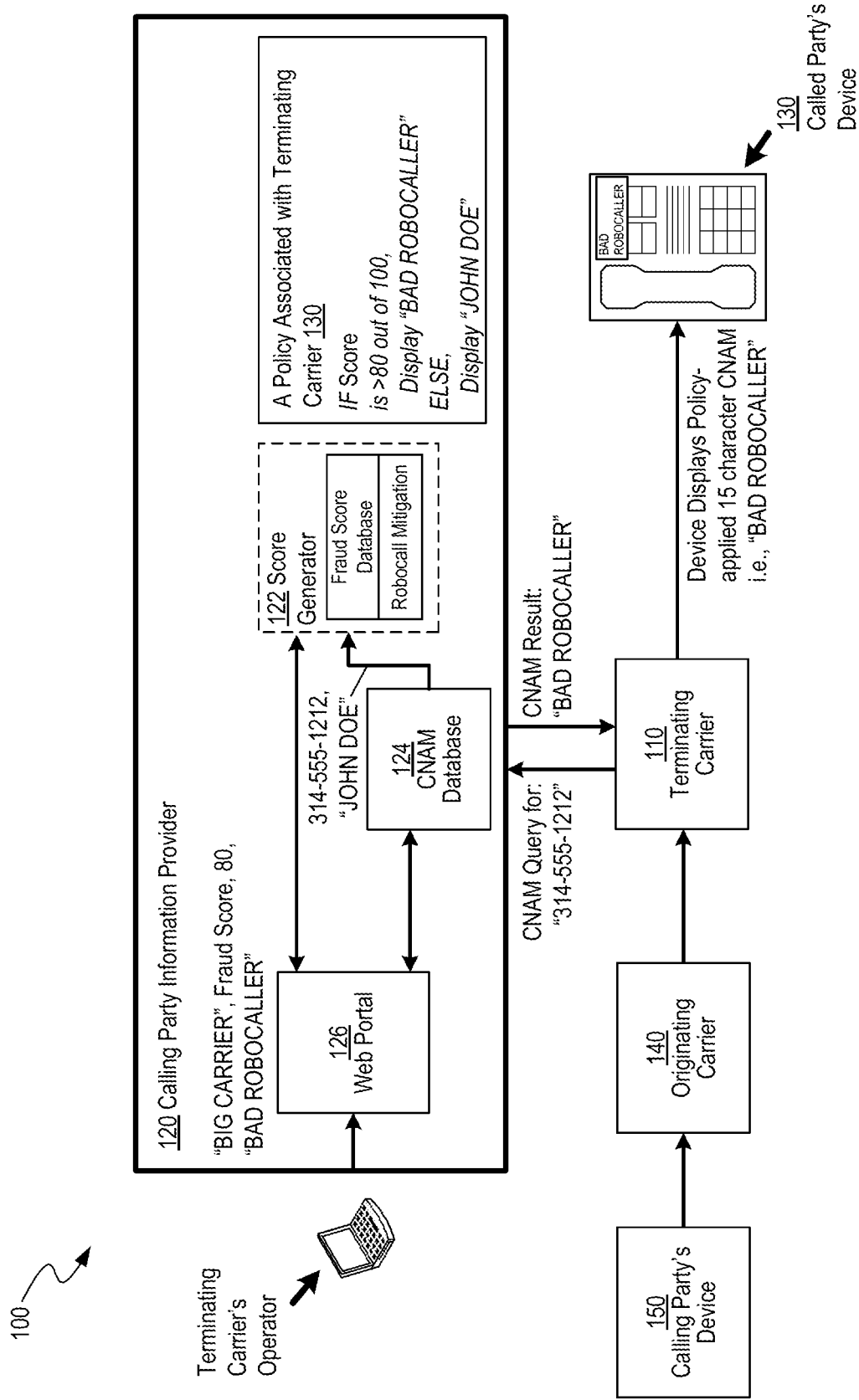
FIG. 1 illustrates an example of a system in accordance with the disclosed embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

As used herein, a Caller ID Name (CNAM) refers to a name and/or other subscriber information retrieved from a CNAM database. Further, a Caller ID refers to the 10-digit telephone number associated with a calling party/device and used to query a CNAM database to retrieve an associated CNAM.

Aspects of the disclosure pertains to communication systems and methods for providing calling party information to a called party's device. The calling party information may be generated based on a score indicative of a likelihood of a call being a robocall, scam, or otherwise an undesirable call. The calling party information may be generated further based on a policy associated with a terminating carrier. Moreover, the calling party information may be provided to the called party's device in place of the CNAM such that the calling party information can be displayed on all devices capable of displaying a CNAM.

FIG. 1 illustrates an example of a system 100 in accordance with the disclosed embodiments. System 100 includes a terminating carrier (or a service provider) 110, a calling party information provider 120, a called party's device 130 connected to a network of terminating carrier 110, an originating carrier (or a service provider) 140, and a calling party's device 150 connected to a network of originating carrier 140. In some embodiments, calling party information provider 120 may be a part of (e.g., integrated or included with) terminating carrier 110.

In the example of FIG. 1, a call is placed to called party's device 130 by calling party's device 150. In some instances, the call may be a robocall placed by a software program executing on calling party's device 150 (or on a device connected to the calling party's device 150). In some other instances, the call may be a scam call or otherwise an undesirable call (e.g., unauthorized advertising). Other times, the call may be a legitimate call (e.g., a personal call from a family member, an advertising from an authorized business). After the call is placed by the calling party's device, the call is routed to terminating carrier 110 by originating carrier 140. In some embodiments, the call may be routed to terminating carrier 110 via a dedicated, carrier-to-carrier channel. In some embodiments, the call may be routed to terminating carrier 110 via Public-switched Telephone Network (PSTN). In some embodiments, originating carrier 140 and terminating carrier 110 may be the same, and the call may be routed by the carrier internally.

Terminating carrier 110, prior to routing the call to called party's device 130, may query calling party information provider 120 to obtain information associated with the calling party (i.e., calling party information). The query may include, for example, an identifier associated with the calling party or calling party's device 150, such as the telephone number assigned to calling party's device 150. In some embodiments, calling party information provider 120 may include, and/or be connected to, one or more CNAM databases 124, and terminating carrier 110 may query calling party information provider 120 for the calling party information using conventional CNAM protocols/standards (e.g., Telcordia GR-1188 CLASS Feature: Calling Name Delivery Generic Requirements).

For example, calling party information provider 120 may receive a telephone number of the calling party's device 150 using a standard CNAM query protocol, and in response, calling party information provider 120 may provide terminating carrier 110 with a result of the query using a protocol/standard that a carrier typically uses when interacting with a CNAM database (e.g., GR-1188). Unlike conventional systems, however, the result of the CNAM query may not be the data retrieved from a CNAM database 124. Instead, the result may be text-based data (15 characters or less) indicating, for example, that the caller is a robocaller or a scammer (if the calling party is determined by calling party information provider 120 to be a robocaller or a scammer). Thus, in these embodiments, calling party information provider 120 may be deployed on an existing CNAM infrastructure and may be backward compatible with existing carrier equipment.

In some embodiments, the query to calling party information provider 120 may include results from call verifications and/or trustworthiness checks performed by terminating carrier 110. For example, the query to calling party information provider 120 may include a result of a call verification performed by terminating carrier 110 using emerging call authentication Internet Engineering Task Force (IETF) standards like Secure Telephony Identity Revisited (STIR).

Further, calling party information provider 120 may be utilized by time-division multiplexing (TDM)-, Voice-over-IP (VoIP)-, and IP-based carriers. Moreover, calling party information provider 120 may be further utilized, for example, by caller ID applications executing on smartphones.

After receiving the query, calling party information provider 120 may determine a name associated with the calling party. In embodiments where an identifier of the calling party or the calling party's device 150 is included in the query, calling party information provider 120 may use the identifier to determine the name associated with the calling party. For example, calling party information provider 120 may look up a name associated with the telephone number associated with the calling party in CNAM database 124.

Subsequently, calling party information provider 120 may determine a fraud (or reputation) score associated with the call based on the identifier associated with the calling party or calling party's device 150 and/or the name associated with the calling party. The fraud score may be indicative of the likelihood that the call placed by the calling party is a robocall, scam, or otherwise an undesirable call. In some embodiments, the fraud score may be generated further based on verifications performed by terminating carrier 110 and/or calling party information provider 120. For example, the fraud score may be generated based on a result of a call verification performed by terminating carrier 110 using a Certified Caller STI-VS system. In these embodiments, the call verification result may have been included as a part of the query transmitted to calling party information provider 120 by terminating carrier 110. Additionally, or alternatively, score generator 122 may receive data from sources that can verify trustworthiness of an incoming call, and generate the fraud score based on the received data. The sources may be a part of, or external to, terminating carrier 110 and/or calling party information provider 120.

In some embodiments, calling party information provider 120 may determine the fraud score prior to determining the name associated with the calling party. For example, calling party information provider 120 may determine the name associated with the calling party after determining that the fraud score is above a predetermined threshold value (i.e., indicating that the call is likely to be a robocall, scam, or otherwise an undesirable call). Alternatively, calling party information provider 120, after determining that the fraud score is above a predetermined threshold value, may forego determining the name associated with the calling party. In these embodiments, the threshold value may be determined by, for example, calling party information provider 120. Alternatively, or additionally, the threshold value may be determined by the carriers that utilize calling party information provider 120, for example, via a web portal 126. In the example of FIG. 1, the threshold value is set to 80 out of 100 by an administrator of terminating carrier 110. In some embodiments, the threshold value may be dynamically determined (e.g., based on near-real-time analytics and default policy).

In some embodiments, as shown in FIG. 1, calling party information provider 120 may include a score generator 122, and score generator 122 may generate the fraud score. In these embodiments, score generator 122 may receive, from CNAM databases 124, an identifier and/or the name associated with the calling party and generate the fraud score based on an identifier and/or the name associated with the calling party. In some embodiments, score generator 122 may further receive other data included in the query transmitted by terminating carrier 110 and received at calling party information provider 120. For example, score generator 122 may receive a result of a call verification performed by terminating carrier 110 using a system based on emerging IETF STIR standards.

As discussed below with respect to FIG. 2, the fraud score may be determined based on a number of factors. In some embodiments, the fraud score may be determined based on prior queries received by calling party information provider 120 and/or the calling party information provided by calling party information provider 120 in response to the queries. For example, calling party information provider 120 may determine the fraud score by detecting whether there are abnormal and/or unexpected calling patterns in the prior, received queries.

After the fraud score is determined, calling party information provider 120 may generate calling party information based on the fraud score. In some embodiments, the generated calling party information may be based on the fraud score and further based on a result of a call verification performed by terminating carrier 110. As discussed above, the call verification result may have been included as a part of the query transmitted to calling party information provider 120 by terminating carrier 110. In some embodiments, the calling party information may include the data retrieved from CNAM databases 124. For example, after determining that the fraud score is below a threshold value (i.e., indicating that the call is unlikely to be a robocall, scam, or otherwise an undesirable call), the calling party information may include the name associated with the calling party, which may be retrieved from CNAM database 124. Alternatively, or additionally, in some embodiments, the calling party information may include information that is generated based on the fraud score and/or a result of a call verification performed by carrier 110. For example, the calling party information may include the text "high risk" when the fraud score is determined to be above a threshold value, or the text "low risk" when the fraud score is determined to be below the threshold value. In some embodiments, the calling party information may be limited to 15 characters or less.

In some embodiments, the calling party information may be generated based on a policy configured by the carriers utilizing calling party information provider 120. For example, as shown in FIG. 1, terminating carrier 110 may be associated with a policy that generates calling party information that includes text "BAD ROBOCALLER" when the fraud score is determined to be above a threshold value or calling party information that includes the CNAM associated with the calling party when the fraud score is below a threshold value. In another example, terminating carrier 110 may be associated with a policy that generates calling party information appending one or more text-based indicators (e.g., an asterisk or "[SPAM]") to the CNAM associated with the calling party when the fraud score is above a threshold value. In this example, the policy may generate calling party information that includes the CNAM associated with the calling party when the fraud score is below a threshold value.

Calling party information provider 120 may include one or more policies that may be associated with one or more carriers that utilize calling party information provider 120. Carrier administrators may configure their policy for example, via web portal 126.

Subsequently, the generated calling party information may be provided to terminating carrier 110. Further, terminating carrier 110 may provide at least some of the calling party information (or information derived from at least some of the calling party information) to called party's device 130. In some embodiments, at least a portion of the generated calling party information may be provided to terminating carrier 110 using a protocol/standard used to provide a result of a CNAM query to a carrier. For example, the generated calling party information may include text "BAD ROBOCOLLER" and the text may be provided to called party's device 130 as a CNAM. For example, in IP-based networks, the generated calling party information may be signaled in the "Display Name" portion of either the SIP From or P-Asserted-Identity header.

Called party's device 130, after receiving the calling party information, may display at least a portion of the calling party information. Alternatively, or additionally, called party's device 130, after receiving the calling party information, may cause display of at least a portion of the calling party information on a display connected to called party's device 130. In embodiments where at least a portion of the generated calling party information is provided as a CNAM, the called party's device 130 may display the calling party information in the same manner as a CNAM since the called party's device 130 cannot distinguish the calling party information provided as a CNAM from standard CNAM data. In some embodiments, terminating carrier 110 may prevent the call to called party's device 130 based on the calling party information. For example, if the calling party information includes a code indicative of the call definitely being a scam or a robocall, terminating carrier 110 may block the call before it reaches called party's device 130.

Accordingly, in system 100, calling party information provider 120 provides carriers and called parties (i.e., subscribers) with more definitive and useful information about the calls they are receiving. Based on this information, carriers may elect to block calls or to provide the information to their subscribers.

Figure 2:
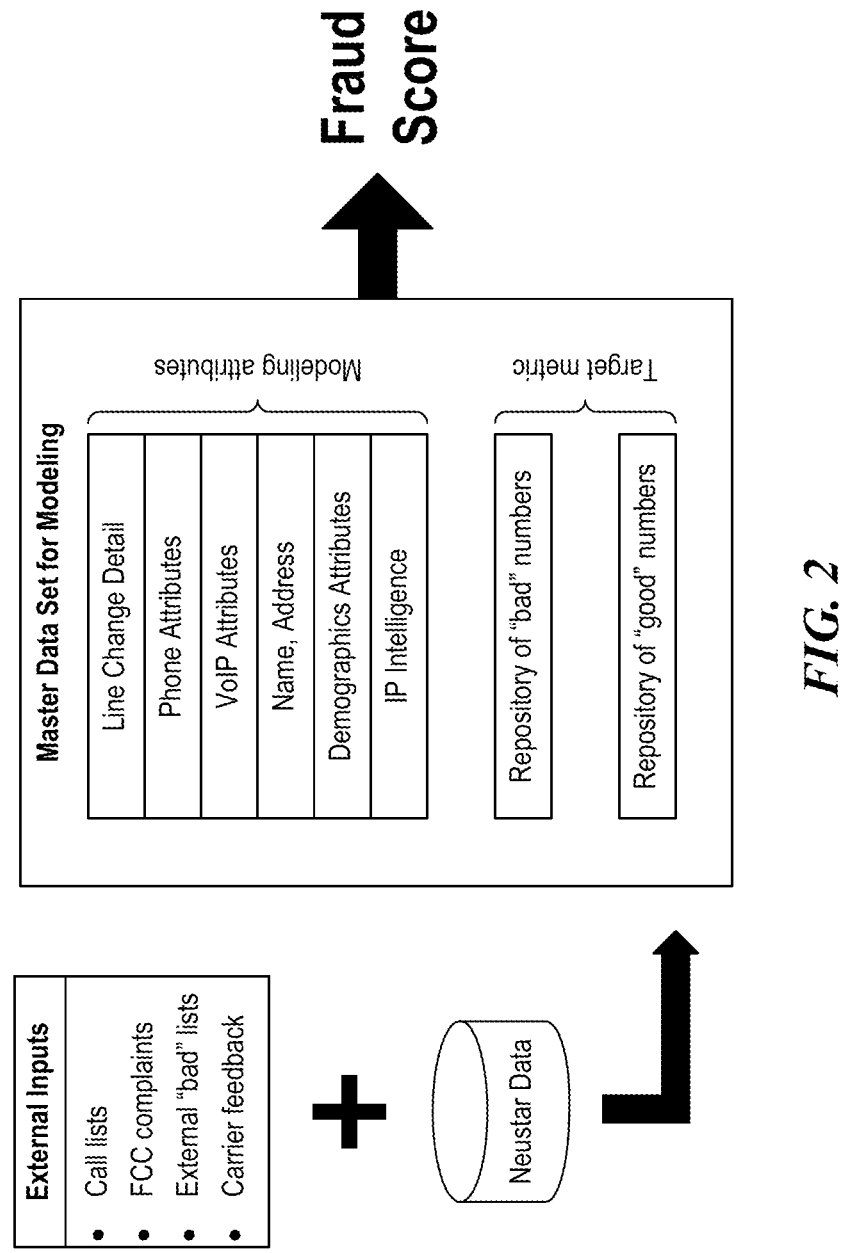
FIG. 2 illustrates potential factors that may be used to determine the fraud score in accordance with the disclosed embodiments.

FIG. 2 illustrates a number of potential factors that may be used to determine the fraud score in accordance with the disclosed embodiments.

As discussed above, the fraud score may be determined based on a number of factors. In some embodiments, the fraud score may be determined based on prior queries received by calling party information provider 120 (e.g., past CNAM queries) and/or the calling party information provided by calling party information provider 120 in response to the queries. In some embodiments, calling party information provider 120 may determine the fraud score by detecting whether there are abnormal and/or unexpected calling patterns detected in the received past queries. In one example, the fraud score may be increased when the number of queries received from the calling party is several times above the party's average over the past several years.

In some embodiments, calling party information provider 120 may have access to other results of call verifications and/or trustworthiness checks performed by terminating carrier 110 (e.g., results from call authentication based on emerging STIR standards). Such results may be provided by terminating carrier 110 as a part of a query transmitted to calling party information provider 120.

In some embodiments, calling party information provider 120 may have access to data containing complaints to the FCC, and the fraud score may be determined by calling party information provider 120 (e.g., score generator 122) based on a number and/or types of complaints that were filed against the calling party at the FCC. For example, an above-average number of complaints to the FCC may increase the fraud score while a below-average number of complaints to the FCC may decrease the fraud score.

In some embodiments, calling party information provider 120 may have access to publicly available data such as National American Numbering Plan (NANP) data and blacklist data from the FCC. In some embodiments, calling party information provider 120 may have access to data provided by carriers. For example, the data may include a list of unassigned telephone numbers, blacklisted telephone numbers, and/or telephone numbers used for testing by the carriers. In this example, the fraud score may set to indicate that the incoming call is an unwanted call if the telephone number of an incoming call is listed in November 2017 FCC Rules for Call Blocking.

In some embodiments, the fraud score may be determined based on telephone number porting data, which may include, for example, a list of telephone numbers that were ported from one carrier to another over a predetermined period of time. A fraud score may be adjusted to indicate a higher likelihood of an unwanted call if, for example, an incoming call is associated with a telephone number that was ported more than several times over a predetermined amount of time (e.g., a single month/week).

In some embodiments, the fraud score may be determined based on attributes associated with the calling party's device. For example, the fraud score may be determined based on whether the calling party's device is a wireless, wireline, or a VoIP device. In this example, a fraud score may be adjusted to indicate that the incoming call is more likely to be an unwanted call if the call originates from a VoIP device.

In some embodiments, the fraud score may be determined based on demographic attributes of the calling party. For example, a fraud score may be adjusted to indicate that the incoming call is more likely to be an unwanted call if the call originates from outside the United States or from locations known for allowing ease of setup for scam promoting call dialers.

In some embodiments, the fraud score may be determined based on one or more whitelists accessible by calling party information provider 120. The whitelist may have been generated, for example, based on data maintained by calling party information provider 120 and/or provided by the carriers utilizing calling party information provider 120. In one example, the data may include customer data maintained by calling party information provider 120 and/or customer data maintained and provided by the carriers. In this example, the fraud score may set to indicate that the incoming call is not an unwanted call if the telephone number of an incoming call is from known legitimate callers (e.g., from public schools calling about school closing, from pharmacy calling about a prescription that is ready to be picked up).

In some embodiments, the fraud score may be determined based on one or more blacklists accessible by calling party information provider 120. The blacklist may have been generated, for example, based on data maintained by calling party information provider 120 and/or provided by the carriers or organizations utilizing calling party information provider 120.

In some embodiments, the fraud score may be determined based on a historical analysis of the calling party's disposition and calling patterns. For example, if a calling party historically makes 100 calls per weekday over many months and then suddenly starts making 10,000 calls on a Saturday, the fraud score may be adjusted to indicate that the incoming call is more likely to be an unwanted call.

Figure 3:
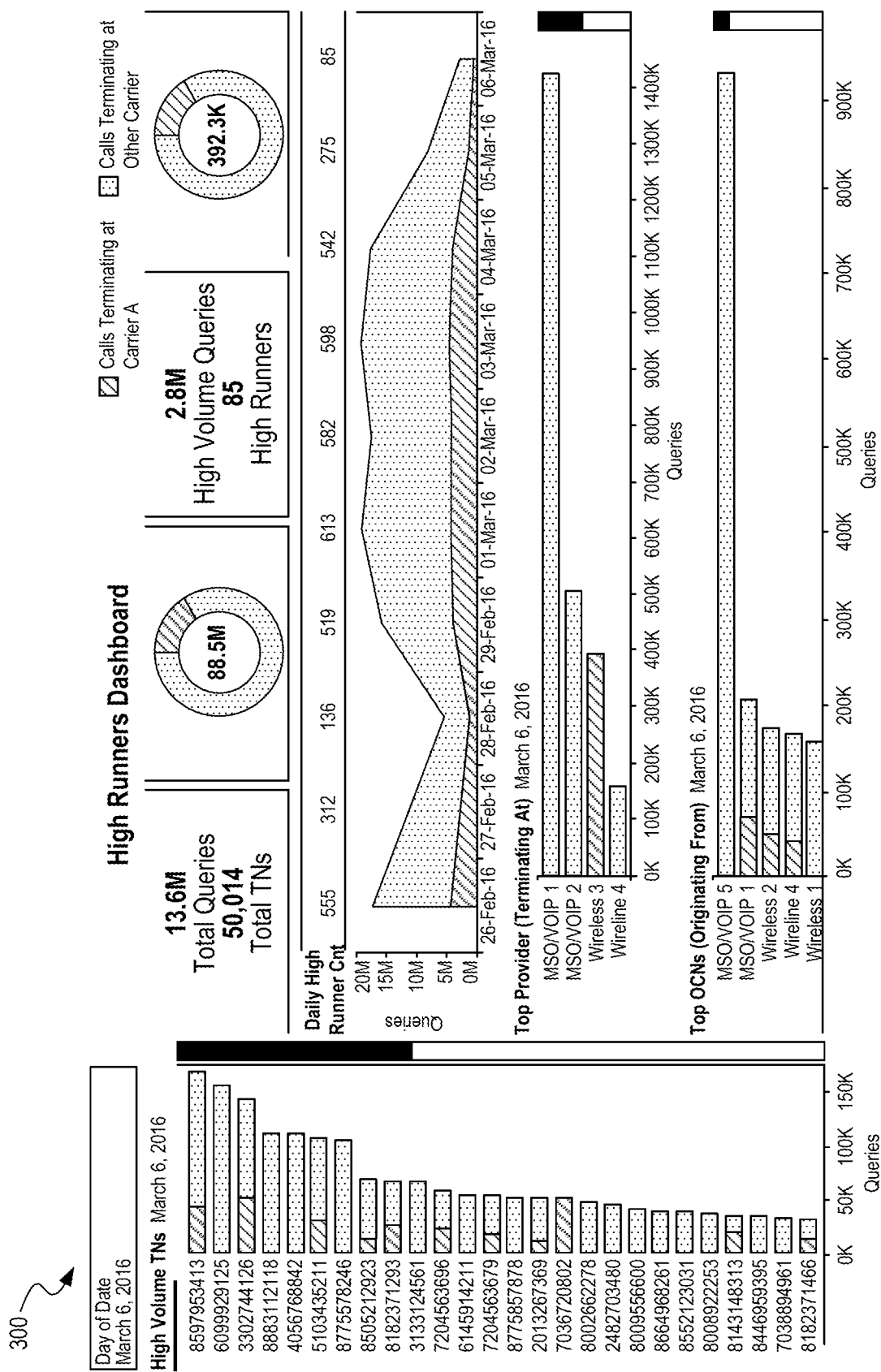
FIG. 3 illustrates an example of a dashboard provided by calling party information provider in accordance with the disclosed embodiments.

FIG. 3 illustrates an example of a dashboard 300 provided by calling party information provider 120 in accordance with the disclosed embodiments. Dashboard 300 may be provided to carriers by calling party information provider 120, for example, via web portal 126. As discussed above, the dashboard may be used, for example, by carriers to modify the policy used to generate the calling party information.

Additionally, dashboard 300, as shown in FIG. 3, can display a number of metrics determined by calling party information provider 120. For example, dashboard 300 shows the number of queries received by calling party information provider 120, the number of the calling party's telephone numbers that queried calling party information provider 120. In addition, dashboard 300 lists telephone numbers associated with the calling party making a large number of queries to calling party information provider 120.

Dashboard 300 further includes a list of terminating carriers making the largest number of queries and a list of carriers that are involved in the largest number of queries as originating carriers.

Moreover, dashboard 300 further includes a number of high runners. A high runner may be defined as a telephone number that generated more than a predetermined number of queries (e.g. greater than 1,000 per day).

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A server for providing calling party information, comprising:
   one or more processors configured to:
   receive a query for the calling party information from a carrier, the query including a telephone number associated with a calling party;

determine a score based on one or more previously obtained queries, wherein the score is based on a number of times the telephone number associated with the calling party was ported from one carrier to another over a predetermined period of time;

generate the calling party information based on the score; and transmit the calling party information to the carrier, wherein the carrier transmits the calling party information to a device associated with a called party as a Caller ID Name (CNAM).

2. The server of claim 1, wherein the score is indicative of a likelihood that a call from the calling party is a robocall, scam, or otherwise an undesirable call.

3. The server of claim 1, wherein the calling party information is generated further based on a policy associated with a terminating carrier.

4. The server of claim 1, wherein the query includes a result of call verification obtained by the carrier, and the calling party information is generated further based on the result of the call verification.

5. The server of claim 4, wherein the result of the call verification is performed by a call authentication system connected to the carrier.

6. The server of claim 1, wherein the query includes a result of call verification obtained by the carrier, and the score is determined further based on the result of the call verification.

7. A method for providing calling party information, comprising:

receiving a query for the calling party information from a carrier, the query including a telephone number associated with a calling party;

determining a score based on one or more previously obtained queries, wherein the score is based on a number of times the telephone number associated with the calling party was ported from one carrier to another over a predetermined period of time;

generating the calling party information based on the score; and transmitting the calling party information to the carrier, wherein the carrier transmits the calling party information to a device associated with a called party as a CNAM.

8. The method of claim 7, wherein the score is indicative of a likelihood that a call from the calling party is a robocall, scam, or otherwise an undesirable call.

9. The method of claim 7, wherein the calling party information is generated further based on a policy associated with a terminating carrier.

10. The method of claim 7, wherein the query includes a result of call verification obtained by the carrier, and the calling party information is generated further based on the result of the call verification.

11. The method of claim 10, wherein the result of the call verification is performed by a call authentication system connected to the carrier.

12. The method of claim 7, wherein the query includes a result of call verification obtained by the carrier, and the score is determined further based on the result of the call verification.

13. A non-transitory computer-readable storage medium storing instructions that, when executed by a computer, cause the computer to perform a method for providing calling party information, the method comprising:

receiving a query for the calling party information from a carrier, the query including a telephone number associated with the calling party;

determining a score based on one or more previously obtained queries, wherein the score is based on a number of times the telephone number associated with the calling party was ported from one carrier to another over a predetermined period of time;

generating the calling party information based on the score; and transmitting the calling party information to the carrier, wherein the carrier transmits the calling party information to a device associated with a called party as a Caller ID Name (CNAM).

14. The non-transitory computer-readable storage medium of claim 13, wherein the score is indicative of a likelihood that a call from the calling party is a robocall, scam, or otherwise an undesirable call.

15. The non-transitory computer-readable storage medium of claim 13, wherein the calling party information is generated further based on a policy associated with a terminating carrier.

16. The non-transitory computer-readable storage medium of claim 13, wherein the query includes a result of call verification obtained by the carrier, and the calling party information is generated further based on the result of the call verification.

17. The non-transitory computer-readable storage medium of claim 16, wherein the result of the call verification is performed by a call authentication system connected to the carrier.

18. The non-transitory computer-readable storage medium of claim 13, wherein the query includes a result of call verification obtained by the carrier, and the score is determined further based on the result of the call verification.

* * * * *